(12) United States Patent
Nimbalker et al.

(10) Patent No.: US 9,078,278 B2
(45) Date of Patent: *Jul. 7, 2015

(54) METHOD AND APPARATUS FOR SOFT BUFFER MANAGEMENT FOR CARRIER AGGREGATION

(71) Applicant: MOTOROLA MOBILITY LLC, Libertyville, IL (US)

(72) Inventors: Ajit Nimbalker, Buffalo Grove, IL (US); Vijay Nangia, Algonquin, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,719

(22) Filed: Mar. 18, 2014

(65) Prior Publication Data

US 2014/0198758 A1    Jul. 17, 2014

Related U.S. Application Data

(63) Continuation of application No. 12/899,153, filed on Oct. 6, 2010, now Pat. No. 8,724,742.

(51) Int. Cl.
*H04L 7/02* (2006.01)
*H04W 72/12* (2009.01)
(Continued)

(52) U.S. Cl.
CPC ............. *H04W 72/1252* (2013.01); *H04L 7/02* (2013.01); *H04L 1/1822* (2013.01); *H04L 5/0044* (2013.01); *H04L 1/1812* (2013.01)

(58) Field of Classification Search
USPC .................................. 375/219, 316, 260, 259
See application file for complete search history.

(56) References Cited

U.S. PATENT DOCUMENTS

| | | | |
|---|---|---|---|
| 5,414,730 A | * | 5/1995 | Lundquist et al. ............. 375/150 |
| 6,700,867 B2 | * | 3/2004 | Classon et al. ................. 370/216 |

(Continued)

FOREIGN PATENT DOCUMENTS

| KR | 20100107418 A | | 10/2010 |
|---|---|---|---|
| WO | 2009118595 A2 | | 10/2009 |
| WO | WO 2009118595 | * | 10/2009 |

OTHER PUBLICATIONS

3GPP TSG RAN #65, R1-111863 Change Request on "Rate maching parameters for CA" NTT DoCoMo et al., Barcelona, Spain May 9-13, 2011.

(Continued)

*Primary Examiner* — Santiago Garcia
(74) *Attorney, Agent, or Firm* — Lerner, David, Littenberg, Krumholz & Mentlik, LLP

(57) ABSTRACT

An apparatus and a method therein include selecting a size of a soft buffer memory partition per component carrier in a Carrier Aggregation scenario. The method supports multiple carriers to select a size of a soft buffer memory partition, the partition associated with receiving data on at least one component carrier, the multi-carrier system comprising at least two component carriers, each component carrier is associated with a configured bandwidth, the apparatus comprising the processor configured to select a size of a soft buffer memory partition for the first component carrier based at least in part on a first total number of soft channel bits, a first number associated with hybrid automatic retransmit request processes, and the configured bandwidth of the first component carrier.

16 Claims, 2 Drawing Sheets

(51) Int. Cl.
*H04L 1/18* (2006.01)
*H04L 5/00* (2006.01)

(56) References Cited

U.S. PATENT DOCUMENTS

| | | | |
|---|---|---|---|
| 8,588,142 B2 | 11/2013 | Seo et al. | |
| 2008/0320353 A1* | 12/2008 | Blankenship et al. | 714/746 |
| 2009/0180034 A1* | 7/2009 | Treigherman | 348/726 |
| 2009/0232050 A1* | 9/2009 | Shen et al. | 370/328 |
| 2009/0310674 A1* | 12/2009 | Le Leannec et al. | 375/240.12 |
| 2010/0040127 A1* | 2/2010 | Wen | 375/232 |
| 2010/0050034 A1* | 2/2010 | Che et al. | 714/748 |

OTHER PUBLICATIONS

International Preliminary Report on Patentability for Application No. PCT/US2011/051304 dated Apr. 9, 2013.

Korean Office Action for Application No. 10-2013-7011586 dated Aug. 28, 2014.

Patent Cooperation Treaty, "PCT Search Report and Written Opinion of the International Searching Authority" for International Application No. PCT/US2011/051304 (CS37762) Nov. 15, 2011, 15 pages.

Chinese Office Action for Application No. 201180048010.7 dated Feb. 2, 2015.

\* cited by examiner

METHOD AND APPARATUS FOR SOFT BUFFER MANAGEMENT FOR CARRIER AGGREGATION

FIELD OF THE DISCLOSURE

The present disclosure relates generally to wireless communications and, more particularly, to soft buffer partition size determination in wireless terminals in wireless communication systems.

BACKGROUND

Digital data transmissions over wired and wireless links may be corrupted, for instance, by noise in the link or channel, by interference from other transmissions (e.g., radio transmissions), or by environmental factors related to, for example, the speed, direction, location and requests between transmitting and receiving units. Even with clear communication channels (i.e., channels with limited corruption), which lend themselves to relatively high data rates, it may not be possible to appropriately decode a data stream with the requisite error rates. Digital data transmissions may also be limited by an inability of the receiving or transmitting equipment to appropriately encode and decode the data stream at the desired speed with the requisite error rate.

In other situations, it may not be feasible to provide hardware suitable for high rate data transmission at a cost and portability demanded by the application. Requested services may range from voice communications over high-speed Internet connections to video conferencing. The hardware at the receiver should be light and use minimal amounts of power in portable applications. Similarly, digital signal processing hardware for accurate conveyance of data packets should be compact and consume low power. Portability restrictions may require that all system attributes be well designed, using a minimal amount of integrated circuits, electronic components, batteries, and other components.

Error detection and correction codes typically provide mechanisms necessary to reliably receive and decode data packets. Forward error correction (FEC) codes allow decoders to accurately reconstruct data packets received with possible errors at the expense of some additional overhead (e.g., extra parity bits, extra symbols). Forward error protection may protect a data packet. With FEC, the protected data packet is generally "self-decoding" in that all the data (information) required to reconstruct the data packet is within a single receive block. Stored data may rely on FEC for reliable extraction. In two-way systems, an opportunity for requesting that a data packet be retransmitted upon detection of an error may be available. For example, an automatic repeat or retransmission request (ARQ) may be sent upon detection of an error using, for example, a parity bit check or a cyclic redundancy check (CRC), and then the original data packet may be discarded. Upon receipt of an ARQ request at the sending station, the packet may be retransmitted in its original form.

While this simple combination of ARQ and FEC is sometimes called Type I ARQ, the term "hybrid ARQ" is usually reserved for a more complex procedure where a receiver may combine previously received erroneous packets with a newly received packet in an effort to successfully ascertain the contents of the packet. The general procedure in a hybrid automatic repeat request (HARQ) system is that a receiver may generate an indicator, such as an ARQ request, upon detection of an error in the received data packet. Unlike Type I ARQ, the receiver does not discard previously received erroneous packets. The receiver may keep (e.g., store) the entire or portions of the erroneous packet because the erroneous packet may still contain worthwhile information, and therefore the erroneous packet is not discarded when using HARQ. By combining erroneous packets, the receiver may be able to assist the FEC to correct the errors. The receiver may require, however, an abundance of volatile memory for storing previous data packets and provisioning for the needs of the HARQ decoder. A HARQ buffer may contain a large amount of memory designated for just this purpose. Large memory requirements, particularly in portable, mobile equipment, may require excessively large space and consume an excessively large amount of power. Managing and optimizing volatile memory available in a communication system is thus desirable.

As demands for higher data rates increase, techniques for inserting more data into a single or multiple channels become more attractive. Adaptive modulation and control (AMC) techniques adjust the modulation scheme used for the transmission of data packets. A clear channel, for example, may use a higher order of modulation, e.g., 64-Quadrature Amplitude Modulation (64-QAM), to transmit data at the higher rate. A noisy or possibly faded and/or interference-limited channel may require the use of a lower order of modulation and consequently a lower data rate. When the channel improves, a high order modulation technique may be used again. Multiple input, multiple output (MIMO) transmission techniques utilizing multiple antennas for transmitting and receiving radio-frequency signals enhance the data rates that are possible using multiple channels. Effective HARQ architectures are needed to extract the full advantages of AMC and MIMO for higher data rates, while retaining compatibility with ARQ and HARQ systems.

In the $3^{rd}$ Generation Partnership Project (3GPP) Long Term Evolution (LTE) wireless communications protocol development, a compliant user terminal is typically allocated spectrum resources on a single compliant carrier in the downlink direction (i.e., from a base station to a user terminal). The uplink spectrum resources for uplink transmissions (i.e., from the user terminal to the base station) may be on a different single compliant carrier for Frequency Division Duplex (FDD) systems or on the same single compliant carrier for Time Division Duplex (TDD) system. For such a compliant user terminal, there is an expected minimum number of soft buffer locations, or a minimum HARQ buffer size that the UE is expected to provide. The cellular base station may then, based on the HARQ buffer size, be able to determine which codeword bits to the send to the user. Typically, the base station may determine the amount of storage per codeword based on the total number soft buffer locations, the number of HARQ processes and the number of layers for spatial multiplexing.

It is anticipated that some wireless communications protocols will support spectrum aggregation wherein a compliant user terminal, also referred to as user equipment (UE), will be expected to receive data on multiple component carriers in a single sub-frame. One such protocol is the 3GPP LTE-Advanced (LTE-A) protocol. Existing control signaling schemes for LTE Release 8 (Rel-8) can be used to allocate resources to a UE on only a single Release 8 compliant carrier. In LTE Rel-8/9, the UE decides the soft buffer size for each TB (Nir) using the following formula provided in 3GPP TS 36.212 Rel-8/9 specification:

$$N_{IR} = \left\lfloor \frac{N_{soft}}{K_{MIMO} \cdot \min(M_{DL\_HARQ}, M_{limit})} \right\rfloor \qquad \text{Eqn. (1)}$$

where $N_{soft}$ is the total number of soft channel bits (from Table 4.4-1 in TS 36.306), $K_{MIMO}$ is equal to 2 if the UE is configured to receive PDSCH transmissions based on spatial multiplexing with rank greater than 1 such as transmission modes 3, 4 or 8, 1 otherwise, $M_{DL\_HARQ}$ is the maximum number of DL HARQ processes (i.e., HARQ processes in the downlink direction), and $M_{limit}$ is a constant equal to 8. For TDD, when the number of DL HARQ processes exceeds 8, techniques such as soft buffer overbooking, equal soft buffer split between HARQ processes, and/or other statistical buffer management techniques are applied. For Rel-10 with Carrier Aggregation (CA), new UE categories with support for 2 Component Carriers (CCs) need to be defined. Other UE categories with support for larger number of CCs may be defined for later releases. The bandwidth (BW) of individual aggregated CCs can be same or different (e.g., 10 MHz+10 MHz, 15 MHz+5 MHz etc.).

For LTE Release 10 with CA, new UE categories with support for 2 component carriers are yet to be defined. Also, other UE categories with support for larger numbers of component carriers may be defined for later releases. The bandwidth of the individual aggregated component carriers can be same or different (e.g. 10 MHz+10 MHz, 15 MHz+5 MHz etc.). Thus, there is a need for a soft buffer management wherein the UE may receive downlink transmissions from the eNB (or a plurality of eNBs) on one or more of the multiple component carriers.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
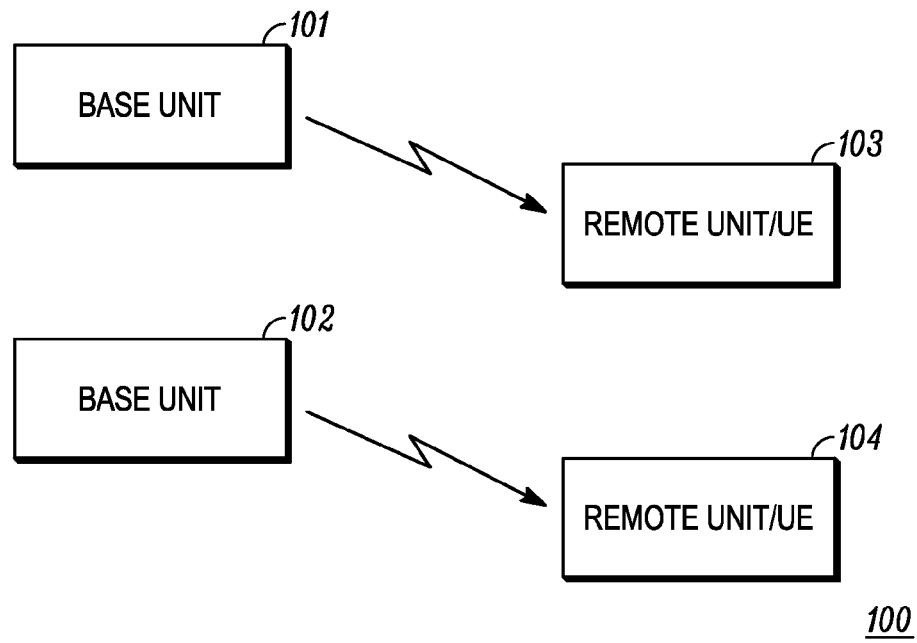
FIG. 1 illustrates a wireless communication system.

In FIG. 1, a multi-carrier wireless communication system 100 comprises one or more fixed base infrastructure units 101, 102 forming a network distributed over a geographical region for serving remote units in the time and/or frequency domain. A base unit may also be referred to as an access point, access terminal, base, base station, Node-B, eNode-B, a relay node, or by other terminology used in the art. The one or more base units each comprise one or more transmitters for downlink transmissions and one or more receivers for receiving uplink transmissions. The base units are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of access and core networks are not illustrated but they are well known generally by those having ordinary skill in the art.

In FIG. 1, the one or more base units serve a number of remote units 103, 104 within a corresponding serving area, for example, a cell or a cell sector via a wireless communication link. The remote units may be fixed units or mobile terminals. The remote units may also be referred to as subscriber units, mobiles, mobile stations, users, terminals, subscriber stations, user equipment (UE), user terminals, relays, or by other terminology used in the art. The remote units also comprise one or more transmitters and one or more receivers. In FIG. 1, the base unit 101 transmits downlink communication signals to serve remote unit 103 in the time and/or frequency and/or spatial and/or code domain. The remote unit 103 communicates directly with base unit 101 via uplink communication signals. A remote unit 104 communicates directly with base unit 102. In some cases the remote unit may communicate with the base unit indirectly through an intermediate relay node.

In one implementation, the wireless communication system is compliant with the 3GPP Universal Mobile Telecommunications System (UMTS) LTE protocol, also referred to as EUTRA or Release-8 (Rel-8) 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme, or a discrete Fourier Transform spread OFDM (DFT-SOFDM). More generally, however, the wireless communication system may implement some other open or proprietary communication protocol, for example, WiMAX, among other protocols. The disclosure is not intended to be limited to the implementation of any particular wireless communication system architecture or protocol.

Figure 2:
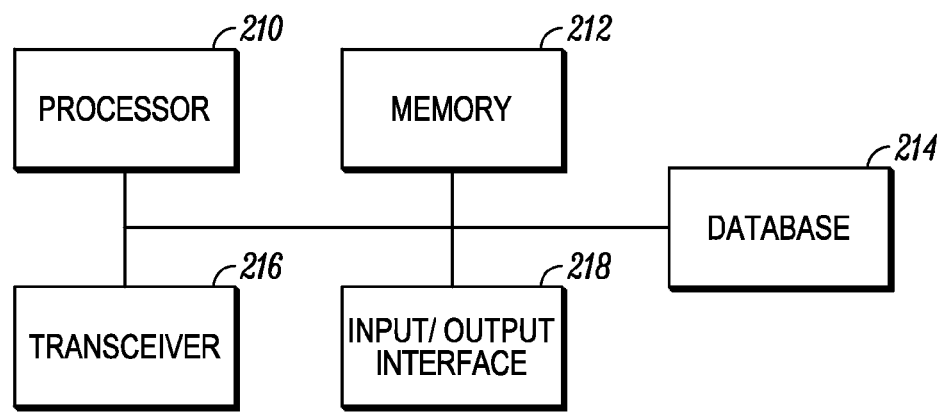
FIG. 2 illustrates a schematic block diagram of a user terminal.

In FIG. 2, a UE 200 comprises a controller/processor 210 communicably coupled to memory 212, a database 214, a transceiver 216, input/output (I/O) device interface 218 via a system bus 220. The UE is compliant with the protocol of the wireless communication system within which it operates, for example, the 3GPP LTE Rel-8 or later generation protocol discussed above. In FIG. 2, the controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a programmable logic array, field programmable gate-array, or the like. In FIG. 2, the memory 212 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The memory may be embedded with an ASIC that may include the baseband processor. Such memory is sometimes referred to as on-chip memory. Alternatively, the memory may be shared with other processors in the device such as an application or graphics processor, in which case the memory may be referred to as off-chip memory. The transceiver 216 is capable of communicating with user terminals and base stations pursuant to the wireless communication protocol implemented. The I/O device interface 218 connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

A wireless communication device in the multi-carrier network generally supports multiple carriers comprising at least two component carriers, wherein each component carrier is associated with a configured bandwidth. For example, a first component carrier may be associated with a first bandwidth and a second component carrier may be associated with a second bandwidth, and so on. The component carrier may be a downlink component carrier or an uplink component carrier in the case of FDD or support both downlink and uplink in the case of TDD. The downlink component carrier and uplink component carrier may have the same or different bandwidth. In one embodiment, the first configured bandwidth of the first component carrier is not equal to the second configured bandwidth of the second component carrier. For instance, the first component carrier bandwidth may be 15 MHz, while the second component carrier may be 5 MHz, leading to an aggregate bandwidth of 20 MHz. In another embodiment, the first configured bandwidth of the first component carrier is equal to the second configured bandwidth of the second component carrier. For instance, the first and second component carriers have an equal bandwidth of 10 MHz each, leading to an aggregate bandwidth of 20 MHz.

The wireless communication device can receive data transmissions on multiple component carriers using multiple serving cells with each serving cell associated with a particular component carrier of a particular bandwidth. The wireless communication device can indicate to the network the number of component carriers it supports using Radio Resource Configuration (RRC) signaling. Alternately, the wireless communication device can also indicate to the network via RRC signaling, the number of component carriers it can support and the number of spatial layers (i.e., the number of TBs that the device can receive via spatial multiplexing) it can support for each component carrier or the total number of spatial layers over all the component carriers it supports or a subset of the supported component carriers.

In one embodiment, a soft buffer size for LTE Release 10 (Rel-10) UE categories is specified in a specification document such as a 3GPP Technical Specification based on the cumulative aggregated bandwidth. This allows for defining fewer UE categories based on maximum possible data rate handled by the UE. An example is described below with reference to Table 1. According to this embodiment, computation of soft buffer size for each TB for each component carrier can be done by introducing component carrier related variables into Equation (1).

Consider the example of Category (Cat) 6 in Table 1. This UE category is based on LTE Rel-8/9 Cat3 but with carrier aggregation (CA) support for 2 component carriers. The peak data rate handled by cat6 is same as cat3 (i.e., ~100 Mbps) but cat6 can achieve the peak data rate by receiving on either one CC with 20 MHz bandwidth or on two CCs whose aggregate bandwidth is 20 MHz. Cat6 can be useful for deployments where spectrum is available in two separate 10 MHz portions in different bands (e.g., Band 13 and Band 1 as specified in the 3GPP specification) or in Heterogeneous network deployments (comprising base stations of different classes/characteristic/coverage features such as macro eNBs, femto cells, pico cells, relay cells, etc) where the available bandwidth is split into to 2 CCs (or a plurality of CCs in general) for the purpose of interference management or load sharing or resource sharing.

TABLE 1

Rel-10 UE categories (based on aggregated bandwidth configuration)

| UE Category | Maximum number of DL-SCH TB bits received within a TTI | Maximum number of bits of a DL-SCH TB received within a TTI | Total Number of soft channel bits | Maximum number of supported layers for spatial multiplexing in DL | Maximum number of CCs supported | Comments |
| --- | --- | --- | --- | --- | --- | --- |
| Category 1 | 10296 | 10296 | 250368 | 1 | — | Rel8/9 |
| Category 2 | 51024 | 51024 | 1237248 | 2 | — | Rel8/9 |
| Category 3 | 102048 | 75376 | 1237248 | 2 | — | Rel8/9 |
| Category 4 | 150752 | 75376 | 1827072 | 2 | — | Rel8/9 |
| Category 5 | 299552 | 149776 | 3667200 | 4 | — | Rel8/9 |
| Category 6 | 102043 | 75376 | 1237248 | 2 | 2 | Rel10 (20 MHz, any BW combination) |
| Category 7 | 299552 | 75376 | 3667200 | 2 | 2 | Rel10 (40 MHz any BW configuration) |

Figure 3:
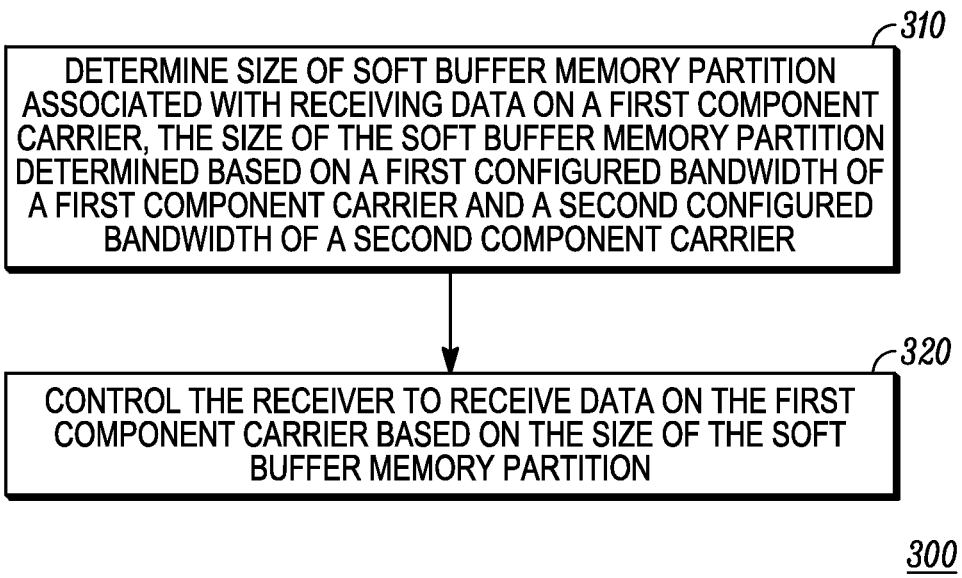
FIG. 3 is a process flow diagram of a first embodiment.

According to one aspect of the disclosure, the processor of the wireless communication device that supports multiple carriers, for example, the transceiver 216 in FIG. 2, is configured to determine a size of a soft buffer memory partition of the memory element for a first component carrier. In one embodiment, the soft memory buffer size is determined based on a first configured bandwidth of the first component carrier and a second configured bandwidth of a second component carrier. The process flow diagram 300 of FIG. 3 schematically illustrates this portion of the process at 310. The processor is also configured to control the receiver, for example, the transceiver 216 in FIG. 2, to receive data on the first component carrier based on the size of the soft buffer memory partition, as illustrated at 320 in FIG. 3.

In one implementation, the processor is configured to determine the size of the soft buffer memory partition based on a total number of soft channel bits. In one specific embodiment, the total number of soft channel bits is determined based on a category of the wireless communication device. For instance, the UE category 6, the total number of soft channel bits is 1237248 bits. In another embodiment, the total number of soft channel bits is determined based on a first number associated with HARQ processes determined based at least in part on duplex mode. For instance, for the FDD system, the first number associated with the HARQ processes may be fixed to 8, corresponding to eight HARQ processes support in LTE FDD Rel-8 for some transmission modes (i.e., configured to transmit a maximum of single TB per TTI), whereas it may be 8 or 16 for other transmission modes (i.e., configured to transmit a maximum of 2 TBs per TTI). In future releases, the number may be different because of future HARQ optimization (such as further reduced latency leading to smaller HARQ Round Trip Times (RTT) such as from 8 ms in Rel-8 to e.g., 4 ms, smaller TTIs such as 0.5 ms, further fast ACK feedback mechanisms such as HARQ feedback is transmitted within 2 ms instead of 4 ms as in Rel-8, etc). In a TDD system, the number may be dependent upon the uplink/downlink configuration or the configuration of the uplink and downlink subframes with one or more radio frames. In one example, for a downlink subframe heavy configuration wherein there are more downlink subframes than uplink subframes, the number may be as high as 15 HARQ processes in the DL subframe, while in UL heavy subframes (more UL than DL subframes), the number be as low as 4. In another embodiment, the total number of soft channel bits is determined based on a maximum number of TBs transmittable to the wireless communication device in one transmission time interval (TTI). The maximum number of TBs within a TTI can vary based on the transmission mode and/or transmission rank with each component carrier. In another embodiment, the processor is configured to determine the total number of soft channel bits based on a second number associated with HARQ processes determined based at least in part on a number of Multiple Input Multiple Output (MIMO) streams. For instance, if the number of MIMO streams is two or more, it may allow more than one TB to be transmitted with the TTI to the UE. In that case, the total number of soft channel bits may be doubled.

In another embodiment, the first component carrier supports some maximum number of spatial multiplexing layers and the processor determines the size of the soft buffer memory partition based on the maximum number of spatial multiplexing layers supported on the first component carrier.

In another embodiment, a ratio of the size of the soft buffer memory partition for the first component carrier and a size of the soft buffer memory partition for the second component carrier is substantially equal to a ratio of the first configured bandwidth of the first component carrier and the second configured bandwidth of the second component carrier. Thus, if a first component carrier has a bandwidth that is larger than a second component carrier, then the first component carrier may be assigned a proportionally greater soft buffer allocation compared to the second component carrier. This can result in uneven memory partitioning among the component carriers. The processor may also determine the size of the soft buffer memory partition based on a bandwidth corresponding to a signaled category of the wireless communication device.

With reference to Table 1 above, soft buffer dimensioning for UE Cat3 in LTE Rel-8/9 was defined assuming Limited Buffer Rate Matching (LBRM). With LBRM, for a subset of large TB sizes, the UE is allowed to provision a per TB soft buffer size that is smaller than the maximum required soft buffer size to achieve mother code rate of 1/3. For example, a LTE cat3 UE operating with 2 spatial layers must support a largest TB size of 75376. For this TB size, given 1237248 total soft channel bits (i.e., soft buffer size corresponding to these bits), the UE can only provision 77328 soft channel bits per each of the two possible TBs within a TTI (number of TBs within a TTI may vary with the transmission mode or transmission rank and/or based on the control signaling from the eNB). This amounts to an effective mother code rate (ECR) or minimum achievable code rate of around 0.97 for the largest possible TB size. The effective mother code rate may be defined as the number of information bits divided by the number of encoded bits that can be stored in the soft buffer. Note that the effective mother code rate may be different from the code rate employed by the FEC encoder such as the turbo code rate, as the two are defined from different perspectives. It is possible to have a turbo code (FEC encoder) code rate of 1/3, wherein the code is shortened or some of the output parity bits are deleted (due to soft buffer storage limitations) to lead to an effective mother code rate larger than 1/3. For instance, if 50% of the output parity bits are punctured, then the ECR is approximately 2/3 whereas the turbo code rate is 1/3. If the mother code rate (or effective mother code rate) is greater than 1, then the amount of soft buffer storage is likely insufficient as all information bits may not be recoverable. The ECR is reduced for smaller TB sizes. For TB sizes less than 25456 approximately, the ECR is the same as mother code rate of 1/3, which means that LBRM need not be employed.

It is expected that Limited Buffer Rate Matching (LBRM) will also be adopted in LTE Rel-10, especially if the Rel-10 UE Categories are aligned with Rel-8 UE categories in terms of a peak data rate and other attributes such as DL TBS per TTI and DL TBS per CW (e.g., UE Cat6 in Table 1). Assuming that only one soft buffer size is specified on a total aggregated bandwidth, the computation of per TB soft buffer size at the UE for each CC can be handled by the Rel-10 specifications (e.g., in 3GPP TS 3GPP TS 36.212) with the following options.

According to a first option, the soft buffer size that the UE must provision per CC is semi-statically configured by the eNodeB using dedicated RRC signaling. The RRC signaling can be the explicit signaling of a number of soft channel bits provisioned per CC or the signaling of per CC scaling factors that scale the total number of soft channel bits (obtained from a Table in TS 36.306 or another 3GPP specification) for each CC. Here, the soft buffer size per CC may be determined as a percentage or a fraction of the total soft buffer and this percentage is signalled using x bits, wherein x>=1. For instance if x=2, then potentially, the four states designated by the two bits indicate the soft buffer percentage for the corresponding CC such as 25%, 50%, 75% and 100%, respectively. It is also possible to jointly signal the soft buffer size for the CC with other configuration parameters within the RRC signaling used for configuration of the CC.

With reference to Equation (1) above, if $N_{soft}$ is total soft buffer (determined by the UE from the Table in 36.306) and SBPCC1 and SBPCC2 are the two CC-specific percentages or scaling factors signaled in the RRC (or in a higher-layer message or a downlink message) or specified in a communications protocol, then the soft buffer allocated to CC1 is $N_{soft,CC1} = \lfloor SBP_{CC1} \cdot N_{soft} \rfloor$. The remaining soft buffer can be assigned to the second CC $N_{soft,CC2} = N_{soft} - N_{soft,CC1}$ or similar formula as above can be used for CC2.

Within a CC (e.g., CC1), the soft buffer size for each TB (Nir_CCx) can be computed using a formula similar to Equation 1 but with Nsoft, K_MIMO, M_DL_HARQ replaced by Nsoft_CCx, K_MIMO_CCx, M_DL_HARQ CCx respectively. Therefore soft buffer size for each TB received on CC1 (N_IR,CC1) can be computed using the formula $$N_{IR,cc1} = \left\lfloor \frac{N_{soft,CC1}}{K_{MIMO,CC1} \cdot \min(M_{DL\_HARQ,CC1}, M_{limit})} \right\rfloor \quad \text{Eqn. (2)}$$

where N_soft,CC1 is the portion of the total soft buffer (N_soft) partitioned for CC1, K_MIMO_CC1 is a number dependent on the number of spatial multiplexing layers supported in CC1, and M_DL_HARQ,CC1 is equal to the number of HARQ processes supported on CC1. The formula given in Equation 2 is reused for all the other component carriers (e.g., by replacing CC1 with CC2 when two component carriers are used) to compute soft buffer size for TBs received on those component carriers. Although it is possible to make the value M_limit different for each aggregated component carrier to obtain even more flexibility in soft buffer partitioning, maintaining a constant M_limit value across all component carriers is desirable from an implementation simplicity perspective.

The formula in Equation 2 splits the soft buffer partitioned for a particular CC (N_soft,CCx) into K_MIMO, CCx*M_DL_HARQ,CCx equal size partitions where M_DL_HARQ,CCx is equal to the number of HARQ processes supported on CCx and K_MIMO_CC1 is a number dependent on the number of spatial multiplexing layers supported in CCx. For example, when M_DL_HARQ,CCx=8, there can 8 equal sized partitions, when K_MIMO,CCx=1 and 16 equal sized partitions (one per codeword or per transport block) in case of MIMO where K_MIMO,CCx=2. Alternatively, within each CC, the soft buffer may be split unevenly among the HARQ processes for the cases where some HARQ processes require small HARQ memory or soft buffer. For instance, small VoIP packets via semi-persistent scheduling (SPS) may require smaller soft buffer memory due to smaller packet sizes (or TB sizes) compared to other HARQ processes that may be serving file downloads or larger packet sizes. It is also possible to prioritize HARQ processes based on Quality of Service (QoS) or other considerations where in a higher priority HARQ process is assigned a larger soft buffer partition and second priority HARQ process is assigned a second smaller soft buffer partition.

According to a second option, for two DL CCs, the soft buffer for LTE Rel-10 can be split equally between the two DL CCs without explicitly relying on RRC signaling for the soft buffer partition information. In this case SBPCC1=0.5 and SBPCC2=0.5. This option is especially suitable when the bandwidth of aggregated CCs is substantially equal (e.g., if CC1=10 MHz, and CC2=10 MHz). More generally, if P component carriers are used then soft buffer per CC can be computed as $$N_{soft,CC1} = \left\lfloor \frac{N_{soft}}{P} \right\rfloor. \quad \text{Eqn. (3)}$$

Herein, the P component carriers correspond to the configured or activated component carriers. Alternately, P can be the number of component carriers supported by the UE and this number can be indicated by the UE to the base station as part of UE capability signaling. As mentioned previously, the remaining soft buffer locations after the partition using the floor function may be allocated to one of the component carriers (preferably the anchor carrier or the primary component carrier). An anchor or the primary component carrier may be defined as the carrier over which the UE receives synchronization signals, system information messages, and/or paging messages, etc. It may also be defined as the component carrier on which the UE performs Radio Resource Management (RRM) measurement and/or monitors the PDCCH. It is also noted that a ceil or round function may be used instead of the floor for some component carriers. Floor (x) is the largest integer smaller than or equal to x. Ceil (x) is the smallest integer larger than or equal to x.

According to a third option, for two DL CCs, the soft buffer for LTE Rel-10 can be split unequally between the two DL CCs without explicitly relying on RRC signaling for the soft buffer partition information. The implicit partitioning can be based on bandwidth or on a number of resource block (RBs) of each aggregated CC. With this option, if Nsoft is total soft buffer and $BW_{CC1}$ and $BW_{CC2}$ are the two CC bandwidths, then the soft buffer allocated to CC1 is $$N_{soft,CC1} = \left\lfloor \left( \frac{BW_{CC1}}{BW_{CC1} + BW_{CC2}} \right) N_{soft} \right\rfloor \quad \text{Eqn. (4)}$$

The remaining soft buffer can be assigned to the second CC $$N_{soft,CC2} = N_{soft} - N_{soft,CC1} \quad \text{Eqn (5).}$$

Instead of Floor ( ), the Ceil( ), or Round( ), functions can be used alternatively. Also, a similar formula can be used for CC2 soft buffer determination:

$$N_{soft,CC2} = \left\lfloor \left( \frac{BW_{CC2}}{BW_{CC1} + BW_{CC2}} \right) N_{soft} \right\rfloor. \quad \text{Eqn. (6)}$$

Alternatively, implicit partitioning can be based on a maximum sum of TBS that is allowed on each CC. With this option, if Nsoft is total soft buffer and if $TBS_{CC1}$ and $TBS_{CC2}$ are the max sum of TBS per CC1 per TTI and max sum of TBS per CC2 per TTI, then the soft buffer allocated to CC1 is $$N_{soft,CC1} = \left\lfloor \left( \frac{TBS_{CC1}}{TBS_{CC1} + TBS_{CC2}} \right) N_{soft} \right\rfloor .. \quad \text{Eqn. (7)}$$

The same formula can be extended to the case of an arbitrary number of aggregated CCs including three component carriers, four component carriers, and five component carriers.

The remaining soft buffer can be assigned to the second CC as $$N_{soft,CC2} = N_{soft} - N_{soft,CC1}. \quad \text{Eqn (8)}$$

$$N_{soft,CCj} = \left\lfloor \left( \frac{TBS_{CCj}}{\sum_{i=0}^{C-1} TBS_{CCi}} \right) N_{soft} \right\rfloor. \quad \text{Eqn (9)}$$

where $N_{soft,CCj}$ indicates the soft buffer size for component carrier j, wherein the $TBS_{CCi}$ is the maximum TBS sum, i,j=0, 1, 2 . . . C−1 and wherein C is the number of component carriers.

In this case, the maximum data rate achievable by the UE in each CC is capped according to the max sum of TBS per CC (i.e., the maximum number of TB bits within a TTI per CC). For instance, in one example, the 100 Mbps target is achievable by allowing max TBS sum of 75376 on CC1, and 36214 on CC2. Thus, the maximum data rate achievable by the UE on CC1 may only be 75 Mbps, while the remaining 25 Mbps has to be achieved by using CC2. The maximum TBS that is allowed on each CC can be determined by the UE based on per CC bandwidth (or number of RBs) for instance for a 50-RB max allocatable bandwidth, the max TBS may be determined by looking up the TBS/MCS table corresponding to 50 RBs and MCS=26 (largest MCS) in 36.213. Alternatively, the maximum sum of TBS that is allowed on each CC can be specified in the UE category Table in 36.306. Similarly the maximum TBS that is allowed on each CC can be specified in the UE category Table in 36.306. Alternatively, the maximum sum of TBS that is allowed on each CC can be signaled to the UE using RRC signaling, as in the first option described above. Similarly, the maximum TBS that is allowed on each CC can be signaled to the UE using RRC signaling, as in the first option.

Table 2 shows the LTE Rel-10 UE categories (based on aggregated bandwidth configuration). The following parameters may be pre-specified in TS36.306 or these parameters may be signaled as part of the RRC or other higher layer signaling: Maximum number of DL-SCH TB bits received within a TTI for CC1; Maximum number of bits of a DL-SCH TB received within a TTI for CC2; Maximum number of a DL-SCH TB bits received within a TTI for CC1; and Maximum number of bits of a DL-SCH TB received within a TTI for CC2.

In this case, the soft buffer is reconfigured every time any of the variables in the equation change, i.e., whenever an RRC message or another message (e.g., sent on a PDCCH) reconfigures the transmission modes on either CC, etc.

Alternatively, implicit partitioning can be based on the CC bandwidth (in MHz or number of RBs) and considering the number of spatial layers supported on each CC:

$$N_{soft,CC1} = \left\lfloor \left( \frac{K_{MIMO,CC1} \cdot BW_{CC1}}{K_{MIMO,CC1} \cdot BW_{CC1} + K_{MIMO,CC2} \cdot BW_{CC2}} \right) N_{soft} \right\rfloor \quad \text{Eqn. (12)}$$

with the remaining soft buffer can be assigned to the second CC $$N_{soft,CC2} = N_{soft} - N_{soft,CC1} \quad \text{Eqn. (13).}$$

To maximize the achievable data rate within a component carrier denoted as CCx, the maximum number of DL-SCH TB bits received within a TTI for a CCx can be set to the less than or equal to the soft buffer size for a TB on CCx ($N_{IR,CCx}$) times the number of spatial layers supported ($K_{MIMO,CCx}$). It is further limited by the maximum number of DL-SCH TB bits received within a TTI for the aggregated BW. For example, for CC1 BW=15 MHz and CC2 BW=5 MHz, total soft buffer size=1237248 bits, $K_{MIMO,CC1}=2$, $K_{MIMO,CC2}=2$,

TABLE 2

| UE Category | Maximum number of DL-SCH TB bits received within a TTI | Maximum number of bits of a DL-SCH TB received within a TTI | Total Number of soft channel bits | Maximum number of supported layers for spatial multiplexing in DL | Maximum number of CCs supported | Maximum number of DL-SCH TB bits received within a TTI For CC1 | Maximum number of bits of a DL-SCH TB received within a TTI For CC1 | Maximum number of DL-SCH TB bits received within a TTI For CC2 | Maximum number of bits of a DL-SCH TB received within a TTI For CC2 | Comments |
|---|---|---|---|---|---|---|---|---|---|---|
| Category 1 | 10296 | 10296 | 250368 | 1 | — | — | — | — | — | Rel8/9 |
| Category 2 | 51024 | 51024 | 1237248 | 2 | — | — | — | — | — | Rel8/9 |
| Category 3 | 102048 | 75376 | 1237248 | 2 | — | — | — | — | — | Rel8/9 |
| Category 4 | 150752 | 75376 | 1827072 | 2 | — | — | — | — | — | Rel8/9 |
| Category 5 | 299552 | 149776 | 3667200 | 4 | — | — | — | — | — | Rel8/9 |
| Category 6 | 102048 | 75376 | 1237248 | 2 | 2 | 75376 | 75376 | 25376 | 25376 | Rel10 (20 MHz, any BW combination) |
| Category 7 | 299552 | 75376 | 3667200 | 2 | 2 | 149776 | 75376 | 149776 | 75376 | Rel10 (40 MHz any BW configuration) |

Alternately, implicit partitioning can be based on maximum TBS that is allowed on each CC and considering the number of spatial layers supported on each CC. With this option, if Nsoft is total soft buffer and if $TBS_{CC1}$ and $TBS_{CC2}$ are the max of TBS per CC1 per TTI and max of TBS per CC2 per TTI, and $K_{MIMO,CC1}$ and $K_{MIMO,CC2}$ are the $K_{MIMO}$ values for CC1 and CC2, respectively, then the soft buffer allocated to CC1 is $$N_{soft,CC1} = \left\lfloor \left( \frac{K_{MIMO,CC1} \cdot TBS_{CC1}}{K_{MIMO,CC1} \cdot TBS_{CC1} + K_{MIMO,CC2} \cdot TBS_{CC2}} \right) N_{soft} \right\rfloor. \quad \text{Eqn. (10)}$$

The remaining soft buffer can be assigned to the second CC $$N_{soft,CC2} = N_{soft} - N_{soft,CC1} \quad \text{Eqn. (11).}$$

the soft buffer sizes for each CC is $N_{soft,CC1}=927936$, and $N_{soft,CC2}=18336$. The maximum number of DL-SCH TB bits received within a TTI for CC1 and CC2 is 93776 and 36672, respectively, and is less than or equal to the maximum number of DL-SCH TB bits received within a TTI for the aggregated bandwidth which is 102048 bits. The maximum number of bits of a DL-SCH TB received within a TTI for CC1 and CC2 is approximately 55056 and 18336 bits respectively corresponding to the maximum TBS size for the respective CC BW. In any TTI, the sum of the number of DL-SCH TB bits received within a TTI on both CC1 and CC2 is limited by the maximum number of DL-SCH TB bits received within a TTI for the aggregated bandwidth (102048 bits).

For two DL CCs, the soft buffer for LTE Rel-10 can be split unequally between the two DL CCs without explicitly relying on RRC signaling for the soft buffer partition information.

While the above options were shown only for two component carriers, it is understood that same technique can be applied to any number of component carriers. For example with J component Carriers with the j-th component carrier having a bandwidth BWCC,j, the size of soft buffer partition may be determined as follows.

$$N_{soft,CC,j} = \left\lfloor \left( \frac{BW_{CC,j}}{\sum_{i=1}^{J} B_{CC,i}} \right) N_{soft} \right\rfloor. \qquad \text{Eqn. (14)}$$

Generally a multi-carrier network may change an activation or configuration of the component carriers. Such a change may be made by a base station scheduler or network controller entity. In some embodiments, a UE that supports multiple carriers reconfigures soft buffer provisioning during configuration and/or removal of additional component carriers. The soft buffer provisioning can also be reconfigured whenever additional component carriers are activated or deactivated. For example, the UE may re-determine the size of the soft buffer memory partition for one component carrier in response to a change in activation or a change in a configuration of the same component carrier. The UE may also re-determine the size of the soft buffer memory partition for one component carrier in response to a change in activation or a change in a configuration of another component carrier. Typically, the configuration and activation of a component carrier may have subtle differences. For instance, a component carrier may be configured and de-configured on a slower scale compared to an activation/deactivation that may occur more frequently. The activation/deactivation may be considered as providing a similar feature such as non-DRX/DRX (discontinuous reception) in the single component carrier case. A UE may be configured for multiple component carriers but the component carriers may be activated and deactivated more frequently. A de-configured component carrier is deactivated, but a deactivated component carrier may still remain to be a configured component carrier. The serving cell may choose to re-configure the UE to support a different set of component carriers not including the deactivated component carrier.

In some instances however this may result in soft buffer configuration changes that are too frequent, which is undesirable. To alleviate this problem, the base station or eNodeB can signal whether or not the UE should reset its soft buffers for all component carriers. This signaling can comprise one or more bits or codepoints. For example, the signaling could occur in RRC configuration messages that that configure/remove additional component carriers. It could also occur in separate RRC messages, or in Medium Access Control-Control Elements (MAC-CEs) that activate/deactivate additional component carriers.

For a given HARQ process x on CC1, if a scheduled transport block size (TBS) exceeds a effective mother code rate of 1 due to insufficient soft buffer allocation, then the HARQ process x on CC1 can borrow a portion of or the entire soft buffer allocated to HARQ process x from CC2. In the latter case, the TB on the HARQ process x from CC2 is terminated. This approach allows the UE to achieve peak data rates using just one CC. For instance, this can be done by specifying a max sum TBS per HARQ process.

Figure 4:
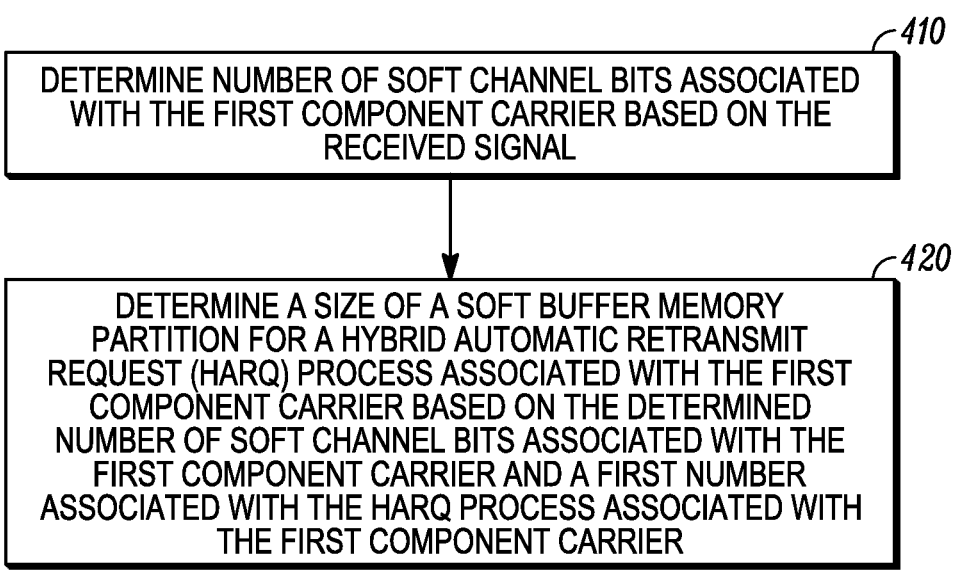
FIG. 4 is a process flow diagram of a second embodiment.

According to one aspect of the disclosure, the processor of the wireless communication device that supports multiple carriers, for example, the transceiver 216 in FIG. 2, is configured to determine a number of soft channel bits associated with the first component carrier based on the received signal. The process flow diagram 400 of FIG. 4 schematically illustrates this portion of the process at 410. In one embodiment, the signal indicates either the number of soft channel bits associated with the first component carrier or a fraction of a total number of soft channel bits associated with the first component carrier. The wireless communication device may thus determine the number of soft channel bits by either obtaining the number directly from the received signal or by performing a computation based on the fractional information provided in the received signal. The received signal is selected from a group comprising: a radio resource control (RRC) message, a carrier activation message, and a carrier configuration message.

The processor is also configured to determine a size of a soft buffer memory partition for a HARQ process associated with the first component carrier based on the determined number of soft channel bits associated with the first component carrier and based on a first number associated with the HARQ process associated with the first component carrier. This portion of the process is illustrated at 420 in FIG. 4. In one embodiment, the size of the soft buffer memory partition is based on a second number associated with the HARQ process associated with the first component carrier. In another embodiment, the size of the soft buffer memory partition is determined based on a first number associated with the HARQ process, wherein the first number comprises a maximum number of downlink HARQ processes on the first component carrier. In another embodiment, the size of the soft buffer memory partition is determined based on a second number associated with HARQ processes, wherein the second number comprises a configured maximum number of HARQ processes on the second component carrier.

In some embodiments, the wireless communication device supporting multiple carriers determines a size of a soft buffer memory partition for a first component carrier based on the received signal. The device also determines a size of a soft buffer memory partition for a HARQ process associated with the first component carrier. The size of the soft buffer memory partition for the HARQ process is based on the number of soft channel bits associated with the first component carrier and based on a first number associated with a HARQ process of the first component carrier. As described above, the signal indicates either the number of soft channel bits associated with the first component carrier or a fraction of a total number of soft channel bits associated with the first component carrier. The wireless communication device may thus determine the number of soft channel bits by either obtaining the number directly from the received signal or by computation based on the fractional information provided in the received signal. The received signal may be embodied as RRC message, or as a carrier activation message, or as a carrier configuration message.

In another embodiment, the wireless communication device supporting multiple carriers selects or determines a size of a soft buffer memory partition for a first component carrier based on a first maximum number of downlink shared channel (DL-SCH) TB bits received within a TTI associated with the first component carrier and a first maximum number of DL-SCH TB bits received within a TTI associated with a second component carrier. In an alternative embodiment, the size of the soft buffer memory partition for the first component carrier is determined based on a second maximum number of bits of a DL-SCH TB received within a TTI associated with the second component carrier and a second maximum number of bits of DL-SCH TB bits received within a TTI associated with the second component carrier.

The soft buffer partition determination is a part of the FEC and HARQ processing in many modern systems, such as LTE Rel-8 and Rel-10 and evolved systems that employ advanced coding techniques such as turbo coding, low-density parity check coding, convolutional coding, Reed-Solomon coding, Reed-Muller coding, etc. If the system uses HARQ processing, then multiple transmissions may be needed for a given information block, and the rate matching algorithm may be required to provide different versions of the codeword (e.g., for incremental redundancy HARQ).

Typically, in LTE Rel-8 and advanced systems, if the input information block (e.g., TB or concatenated TB) to the turbo coder (or the channel encoder) is larger than the maximum size supported by the turbo interleaver (such as based on a Quadratic Permutation Polynomial (QPP)), then the TB is segmented into multiple code block segments or code blocks, each of which is individually turbo-encoded and rate-matched, thus allowing an efficient pipelined operation. Typically, the segmentation procedure may also involve the attachment of Code Block (CB) and/or TB level CRC to facilitate error detection. Some of the relevant details are described in this document, but detailed TB processing including CRC coding, turbo coding with tail bits or tail-biting and tail bits handling in the rate matching procedure is omitted here since it is well known to those of ordinary skill in the art.

In LTE Rel-8 with data channel utilizing turbo coding of the code block segments, the rate matching method comprises receiving systematic bits (typically corresponding to the information bits comprising the code block and optionally CRC bits and filler bits), a first block of parity bits, and a second block of parity bits (and in general any block of encoded parity bits, but not necessarily limited to systematic bits). The systematic bits, the first block of parity bits, and the second block of parity bits may comprise, dummy bits, tail bits and/or filler bits. The systematic bits, first block of parity bits, and second block of parity bits are individually block interleaved and the first block of parity bits are interlaced with the second block of parity bits to create interlaced parity bits. The interleaved systematic bits are pre-pended to the interlaced parity bits to create a circular buffer and redundancy versions are defined to start in particular positions of the circular buffer. When a redundancy version (RV) and a number of desired bits are received, the number of desired bits are output starting at the RV bit position, and taking a desired block of consecutive bits from the circular buffer (wrapped around to the beginning if the last bit of the circular buffer is reached). Different codeword versions for HARQ operation are obtained by utilizing different redundancy versions (RVs). Typically four RVs are defined in LTE Rel-8.

The soft buffer determination is an important element in the HARQ operation, wherein rate matching techniques are used in the receiver if it has a limited amount of soft buffer size. In LBRM, the transmitter may have knowledge of the soft buffer capability of the receiver and hence it is permitted to transmit no more code bits than can be stored in the receiver's soft buffer. If the rate matching is performed on a codeword-by-codeword (i.e., segment by segment) basis, then the LBRM, if included, may also be performed on a codeword-by-codeword (segment-by-segment) basis as well. Therefore, each segment of the TB may have its own circular buffer (or virtual circular buffer). It is generally not necessary to create physical circular buffers for each segment. The circular buffer size for each code word (or segment) is limited to Ncw, where Ncw may be smaller than or equal to the length of the full circular buffer size (per-segment) before LBRM. In case the available soft buffer memory per segment is larger than the full circular buffer size, then the LBRM is transparent. Otherwise, the circular buffer is shortened and bits that may not be stored by the receiver may not be transmitted by the transmitter. This is done by either deleting the bits from the circular buffer and/or by wrapping around at an earlier point rather than the end of the circular buffer.

While the example in the present description uses turbo coding, the same technique for soft buffer and HARQ processing may be applied to other codes such as LDPC codes, convolutional codes, Reed Solomon codes, Reed Muller codes, etc. The same technique may also be applied to the case of carrier segments, wherein a first and second component carriers share at least one subcarrier. For instance, a first component carrier may be using a 10 MHz bandwidth and the second component carrier may be occupying a 20 MHz bandwidth, wherein the second component carrier comprises at least one subcarrier contained in the first subcarrier. In this case, a TB can be scheduled in the first component carrier and subsequently be rescheduled on the second component carrier. Thus, a TB is assigned a soft buffer partition based on the component carrier on which the TB is scheduled on the first transmission. Thus, if the TB is first scheduled on the first component carrier, it is allocated a soft buffer of length X associated with the first component carrier and if it is retransmitted on the second component carrier, then the soft buffer size for the TB is still assumed to be X. Thus, if the TB was first scheduled on the second component carrier, it is allocated a soft buffer of length Y associated with the second component carrier and if it is retransmitted on the first component carrier, then the soft buffer size for the TB is still assumed to be Y. The value of X may not be equal to the value of Y.

In some future networks the UE may be also required to enhance performance by means of cancelling interference. For example, if the UE knows the characteristics of the interference, it can employ suitable means to reduce the impact of the interference. For instance, if a first UE determines that a downlink transmission meant for a second UE is a source of interference, then the first UE may be able to decode the downlink transmission (e.g., by decoding the DL grants) meant for the second UE and cancel the downlink transmission from the received signal to decode data transmissions meant for the UE. In some embodiments, the UE may choose to or be instructed by the serving cell to set aside some soft buffer (as well as computing such as turbo decoding) resources for interference cancellation or for handling interference, in general. In another example, if a first UE acts as a relay node to assist the serving eNB to serve a second UE, then the first UE may have limited soft buffer and computing resources. Such UE may again choose to, or get instructed by the eNB to allocate a portion of soft buffer for serving other UEs and use a second portion of the soft buffer for communicating with the eNB.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication apparatus supporting multiple carriers, the multiple carriers comprising at least two component carriers, each component carrier is associated with a configured bandwidth, the apparatus comprising:
a receiver;

a memory element; and
one or more processors coupled to the receiver and to the memory element, the one or more processors being configured to:
determine a size of a soft buffer memory partition of the memory element for a first component carrier based on a first configured bandwidth of the first component carrier and a second configured bandwidth of a second component carrier and a total number of soft channel bits,
wherein the total number of soft channel bits is determined based on a second number corresponding to a hybrid automatic retransmit request processes determined, based at least in part, on a number of Multiple Input Multiple Output streams, and
control the receiver to receive data on the first component carrier based on the size of the soft buffer memory partition.

2. The apparatus of claim 1, wherein the processor is configured to determine the size of the soft buffer memory partition based on a maximum number of spatial multiplexing layers supported on the first component carrier.

3. The apparatus of claim 1, wherein a ratio of the size of the soft buffer memory partition for the first component carrier and a size of the soft buffer memory partition for the second component carrier is substantially equal to a ratio of the first configured bandwidth of the first component carrier and the second configured bandwidth of the second component carrier.

4. The apparatus of claim 1, wherein the first configured bandwidth of the first component carrier is not equal to the second configured bandwidth of the second component carrier.

5. The apparatus of claim 1, wherein the processor is configured to determine the size of the soft buffer memory partition based on a bandwidth corresponding to a signaled category of the wireless communication apparatus.

6. The apparatus of claim 1, wherein the processor is configured to re-determine the size of the soft buffer memory partition for the first component carrier in response to a change in an activation or a change in a configuration of the second component carrier.

7. The apparatus of claim 1, wherein the processor is configured to re-determine the size of the soft buffer memory partition for the first component carrier based on a change in a transmission mode of the second component carrier.

8. The apparatus of claim 1, wherein the processor is configured to determine the size of the soft buffer memory partition based on a first number associated with the hybrid automatic retransmit request process, the first number comprises a maximum number of downlink hybrid automatic retransmit request processes on the first component carrier.

9. The apparatus of claim 1, wherein the processor is configured to determine the size of the soft buffer memory partition based on a second number associated with hybrid automatic retransmit request processes, the second number comprising a configured maximum number of hybrid automatic retransmit request processes on the second component carrier.

10. The apparatus according to claim 1, wherein the total number of soft channel bits is determined based on any one of the following:
a category of the wireless communication apparatus;
a first number associated with hybrid automatic retransmit request processes determined based at least in part on duplex mode; or
a maximum number of transport blocks transmittable to the wireless communication apparatus in one transmission time interval.

11. A method in a wireless communication apparatus supporting multiple carriers, the multiple carriers comprising at least two component carriers, each component carrier is associated with a corresponding configured bandwidth, the method comprising:
determining, using one or more processors, a size of a soft buffer memory partition associated with receiving data on a first component carrier, the size of the soft buffer memory partition determined based on a first configured bandwidth of a first component carrier and a second configured bandwidth of a second component carrier and a total number of soft channel bits,
wherein the total number of soft channel bits is determined based on a second number corresponding to a hybrid automatic retransmit request processes determined, based at least in part, on a number of Multiple Input Multiple Output streams; and
receiving, using the one or more processors, data on the first component carrier based on the soft buffer memory partition size.

12. The method of claim 11, wherein the first and second component carriers are at least partially non-overlapping.

13. The method of claim 11, determining the size of the soft buffer memory partition based on either a total number of soft channel bits or a first number associated with hybrid automatic retransmit request processes associated with the first component carrier.

14. A method in a wireless communication apparatus supporting multiple carriers, the multiple carriers comprising at least two component carriers, the method comprising:
determining, using one or more processors, a size of a soft buffer memory partition for a hybrid automatic retransmit request (HARQ) process associated with a first component carrier of the multiple carriers based on a number of soft channel bits associated with the first component carrier, a maximum number of spatial multiplexing layers supported on the first component carrier, a first number associated with the HARQ process associated with the first component carrier, and a total number of soft channel bits,
wherein the total number of soft channel bits is determined based on a second number corresponding to a hybrid automatic retransmit request processes determined, based at least in part, on a number of Multiple Input Multiple Output streams; and
receiving, using the one or more processors, a data transmission on the first component carrier based on the determined size of the soft buffer memory partition.

15. The method of claim 14, wherein the size of the soft buffer memory partition is based on a second number associated with the HARQ process associated with the first component carrier.

16. A wireless communication apparatus supporting multiple carriers comprising at least two component carriers, wherein each component carrier is associated with a configured bandwidth, the apparatus comprising:
a transceiver;
a processor coupled to the transceiver, the processor being configured to:
determine a size of a soft buffer memory partition for a hybrid automatic retransmit request (HARQ) process associated with a first component carrier of the multiple carriers based on a number of soft channel bits associated with the first component carrier, a maximum number of spatial multiplexing layers supported on the first component carrier, a first number associated with HARQ process associated with the first component carrier, and a total number of soft channel bits, wherein the total number of soft channel bits is determined based on a second number corresponding to a hybrid automatic retransmit request processes determined, based at least in part, on a number of Multiple Input Multiple Output streams; and receive, via the transceiver, a data transmission on the first component carrier based on the determined size of the soft buffer memory partition.

\* \* \* \* \*